(No Model.)

E. W. GRAM.
BICYCLE SUPPORT.

No. 587,811. Patented Aug. 10, 1897.

Witnesses
Theo. L. Gatchel.
L. M. Graves.

Inventor,
Ernest W. Gram,
by John Wedderburn
Attorney

UNITED STATES PATENT OFFICE.

ERNST W. GRAM, OF LAS VEGAS, TERRITORY OF NEW MEXICO.

BICYCLE-SUPPORT.

SPECIFICATION forming part of Letters Patent No. 587,811, dated August 10, 1897.

Application filed July 18, 1896. Serial No. 599,619. (No model.)

*To all whom it may concern:*

Be it known that I, ERNST W. GRAM, a citizen of the United States, residing at Las Vegas, in the county of San Miguel and Territory of New Mexico, have invented certain new and useful Improvements in Bicycle-Supports; and I do hereby declare the following to be a full, clear, and exact description of the invention, such as will enable others skilled in the art to which it appertains to make and use the same.

My invention relates to bicycle-supports.

My object is to provide a light, cheap, simple, and strong support for bicycles which can be operated without the necessity of dismounting and will be more perfectly adapted to support the bicycle than has heretofore been possible.

Having this object in view, my invention consists of a bicycle-support comprising certain novel features and combinations appearing more fully in the following description and claim.

Figure 1:
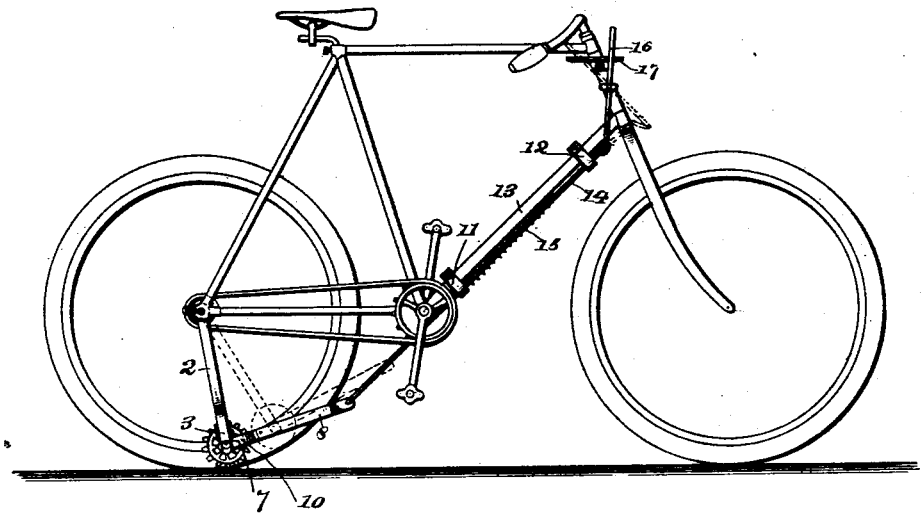
Figure 2:
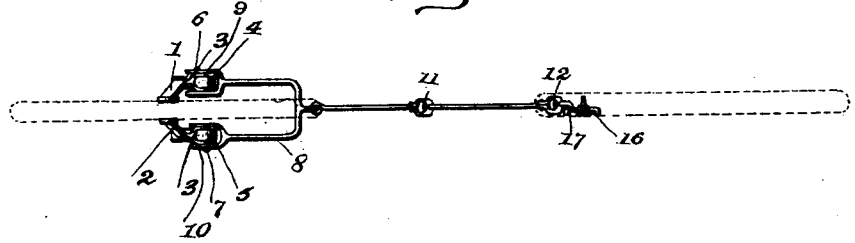

In the accompanying drawings, Figure 1 is a side elevation of a bicycle equipped with my improved support, and Fig. 2 a plan view.

The numerals 1 and 2 designate curved supporting-legs which are pivotally connected to the rear fixed spindle of the bicycle and are bifurcated at their lower ends, as at 3.

The numerals 4 and 5 designate small sprocket-wheels which are received in the bifurcated portions of the legs and are journaled on pins 6 and 7, respectively.

The numeral 8 designates a framework composed of diverging portions which straddle the rear wheel of the bicycle, and the ends of these portions are bifurcated, as at 9 and 10, and they straddle the small wheels and are pivotally connected to the spindle on which said wheels are journaled. Two brackets 11 and 12 are connected to the lower line-tube 13 of the bicycle-frame.

The numeral 14 designates a pull-rod which passes freely through the brackets and has its lower end connected to the extreme forward end of the frame 8. A coil-spring 15, which encircles this pull-rod and is located between the two brackets, has its upper end connected to the rod and its lower end bearing against bracket 11, so that the supporting-legs, the small wheels, and the frame are normally drawn forward and out of engagement with the ground.

The numeral 16 designates a hand-lever which is pivoted to the front portion of the bicycle-frame, and 17 represents a lock with which the lever is adapted to engage, said lock being also connected to the bicycle-frame.

The operation is as follows: If it is desired that the machine be supported, the rider pushes the upper end of the lever forward and brings it into engagement with the lock, so that the parts are locked. When this occurs, the small wheels at the lower ends of the supporting-legs will be thrown into contact with the ground or floor on opposite sides of the bicycle, so that the latter will be properly supported. As soon as the hand-lever is released from the lock the spring returns the parts to normal position, as before described.

My invention is peculiarly adapted for the use of those learning to ride the bicycle, as the support can be thrown into use to sustain the machine without the necessity of dismounting. Hence when the beginner finds that the bicycle is going to fall he only has to throw the support into use and prevent it. It is also adapted for use in connection with army bicycles, as the machine can be supported and the soldier given time to take steady aim.

My improved support is so simple that it can be readily applied to any bicycle, and when in position it is out of the way of the rider.

Having thus described my invention, what I claim as new, and desire to secure by Letters Patent, is—

In a bicycle-support, the combination with legs pivoted to the bicycle and located on opposite sides thereof, and wheels journaled to the ends of said legs, of a rack, a pivoted lever adapted for engagement with the rack, brackets, a pull-rod slidable in said brackets and connected to the frame and the lever, and a coil-spring encircling the pull-rod, being connected thereto and abutting on one of the brackets, said spring being adapted to retract the supporting-legs so as to keep the wheels out of engagement with the ground.

In testimony whereof I have signed this specification in the presence of two subscribing witnesses.

ERNST W. GRAM.

Witnesses:
  GUSTAVE A. ROTHGEB,
  EMIL TSCHANN.